March 5, 1963 H. R. HULETT 3,080,484
ELECTROOPTICAL LIGHT-DETECTING APPARATUS
Filed Dec. 6, 1951 5 Sheets-Sheet 3

INVENTOR.
HENRY R. HULETT.
BY Nicholas T Vohr
att.

March 5, 1963 H. R. HULETT 3,080,484
ELECTROOPTICAL LIGHT-DETECTING APPARATUS
Filed Dec. 6, 1951 5 Sheets-Sheet 5

INVENTOR.
HENRY R. HULETT.
BY Nicholas T Volex
atty.

United States Patent Office 3,080,484
Patented Mar. 5, 1963

3,080,484
ELECTROOPTICAL LIGHT-DETECTING
APPARATUS
Henry R. Hulett, Santa Barbara, Calif., assignor, by mesne assignments, to Hughes Aircraft Company, a corporation of Delaware
Filed Dec. 6, 1951, Ser. No. 260,242
18 Claims. (Cl. 250—203)

This invention relates to electrooptical light-detecting apparatus and more particularly to a star tracking system suitable for star tracking either in the daytime or at night.

It is an object of this invention to provide a light-detecting optical system which is capable of differentiating between the position of a bright object in a brightly illuminated field of view and which is also capable of eliminating the background light, thus being selectively responsive primarily to the light emitted by the bright object.

It is an additional object of this invention to provide a star tracking system having a more uniform amplitude of useful signal and a higher signal-to-noise ratio over the entire operating range of the system than in the known star tracking systems.

It is an additional object of this invention to provide a star tracking system in which the star image is switched to four different positions in the plane of the scanner, the positioning of the image being such that only a constant frequency signal is produced in the output of the system, and the frequency modulation component present in the prior systems, due to the nutation of the image in the plane of the scanner, is altogether eliminated, thus permitting a further improvement in signal-to-noise ratio by narrowing the bandpass frequency of the system.

It is still a further object of this invention to provide a star tracking system in which residual frequency modulation, that is frequency modulation of the star signal resulting from conventional nutation of the star image, is eliminated altogether, thus permitting the use of a narrow bandpass filter, resulting in the very marked improvement of the signal-to-noise ratio.

Celestial guidance of a long-range missile requires a photoelectric device attached to a telescope, this photoelectric device generating electrical signals suitable for moving the telescope automatically into alignment with a selected star. The system should be able to function in full daylight when the sky illumination exceeds the illumination furnished by the star by the order of a million times per angular degree.

The loss of visibility of the star in the daylight is due, almost entirely, to this increased brightness of the sky, and not to any substantial decrease in brightness of the star. Hence, in operating any star tracking system in the daytime, one of the first requirements imposed on the tracking system is the elimination of the background illumination, or, if this is not possible, then at least its diminution to such an extent that the signal produced by the background illumination is insignificant as compared to the desired signal from the star.

In my application for patent entitled "Star Tracking System," filed January 5, 1951, Serial No. 204,613, a star tracking system is disclosed in which the area of the tracking field has been reduced to an absolute minimum, and the signal-to-noise ratio has been further improved by reducing the background illumination with the aid of red or infra-red filters and detectors whose maximum sensitivity is in the infra-red region of the spectrum. In addition, the area of the detector, which may be a lead-sulfide cell, for example, has been drastically reduced.

Reduction in the area of the lead-sulfide cell improves the signal-to-noise ratio because the signal-to-noise ratio of such cells is a function of the square root of the total photoconductive area of the cell. The above application discloses an improved signal-to-noise ratio which, for small angular deviations of the star image, can approximate 30 times the signal-to-noise ratio found in prior systems.

As also described in the aforementioned application, the ratio of the skylight to the starlight is improved by means of a scanner which narrows down the instantaneous field of view to a very small portion of the sky, and then scans this reduced field across the desired tracking field. Such a scanner produces increased bandwidth since bandwidth is approximately an inverse function of the time duration of the scan. From the above, it follows that if it were possible to make this bandwidth as narrow as possible, it would be possible to increase the signal-to-noise ratio. In this prior art system the energy reaching the star tracker is converted into alternating pulsations of energy in the electrical system by interposing a scanner in the optical system of the star tracker. At the very same time, the star image is also nutated around the scanner to obtain a low frequency signal, the phase of this signal indicating the deviation of the position of the star image from that when the optical axis of the telescope points directly at the star. However, nutation of the star image around the scanner produces frequency modulation in the star signal whenever the path of the star image departs from its concentric position with respect to the axis of rotation of the scanner. This frequency modulation, in turn, necessitates widening of the bandpass characteristics of the electrical components of the system. Since the signal-to-noise ratio is an inverse function of the bandpass characteristics of the electrical components of the system, it follows that it is impossible to attain optimum signal-to-noise ratio with systems of this type because of the relatively wide bandpass characteristics of the electrical channel required in the system, and the only way that this signal-to-noise ratio could be improved would be by eliminating the abovementioned frequency modulation.

The star tracking system of the present invention eliminates this frequency modulation, or the so-called residual frequency modulation, by eliminating nutation of the star image and utilizing therefor an image positioning system in which the star image is shifted or switched from one position to the next in successive and intermittent manner. Therefore, with the disclosed system, irrespective of the position of the star image with respect to the axis of scanning disc, the frequency produced, due to the scanning of the radiation by the scanner, is a constant frequency signal, devoid of any residual frequency modulation. This being the case, it at once becomes possible to make the bandpass characteristics of the electronic channel many times narrower than heretofore possible with the previously disclosed systems. Accordingly, the signal-to-noise ratio of the system of the present invention is greatly improved.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Figure 2:
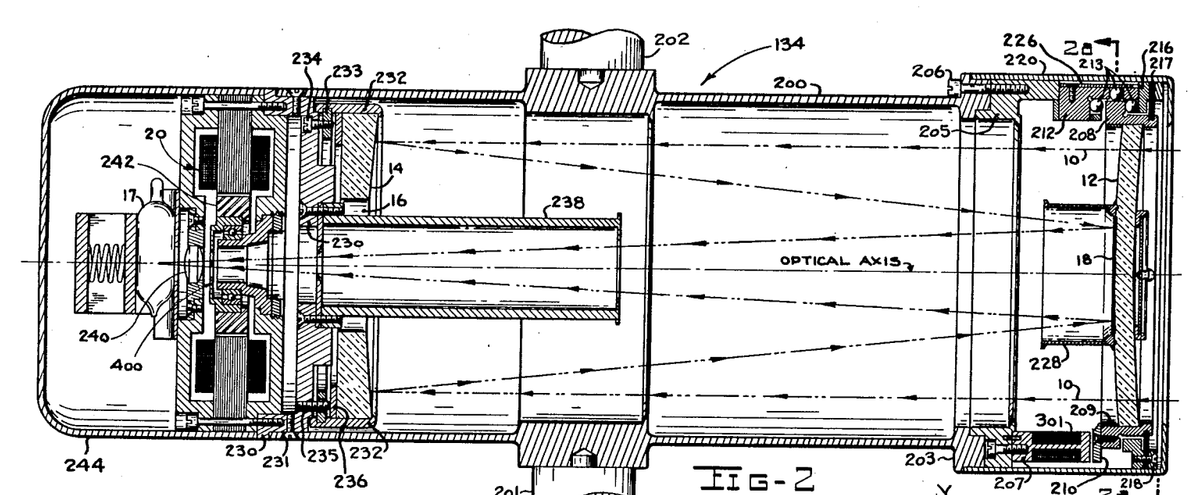
FIGS. 2 through 2d are various sectional views of the telescope of FIG. 1.

Referring now to FIG. 2, light from a star and adjacent sky reaches the optical system of the telescope of the star tracker as a parallel beam of light 10. It passes through a spherical meniscus corrector lens 12 and, after leaving the corrector, goes to a primary aluminized spherically-concave mirror 14 having a centrally located aperture 16. Mirror 14 reflects the light toward a centrally located aluminized mirror portion 18 of the corrector lens 12, which in turn reflects the starlight and brings it into focus in the plane of a scanning disc 400. After passing through the scanning disc, the light is focused by a condensing lens 240 onto the surface of a photoconductive cell 17. The meniscus lens removes the residual spherical aberration of the combined concave and convex mirror surfaces so that a good image is formed through the entire focal plane of the telescope.

The spherical meniscus corrector lens 12, the spherically concave mirror 14 and the spherically-concave mirror 18 represent a completely concentric optical system with all surfaces being spherical and all the spheres having the same center positioned along the extension of the optical axis of the telescope. The focal surface of the system is also spherical and concentric with the other spheres. The meniscus lens 12 removes almost all of the residual spherical aberration that remains from the combination of the concave spherical mirror 14 and convex spherical mirror 18. Moreover, since the system is concentric, there can be no skew rays. Thus, the field can be very large without the image being degraded. Besides having many purely optical advantages, the system also has many structural advantages. For example, the curvature of mirror 18 is identical in curvature to the convex surface of lens 12, and, therefore, one only needs to aluminize the central area of the convex surface of the meniscus lens to obtain the mirrored surface. Hence, no spider is required for holding the secondary mirror 18.

The system is also compact since the entering light beam 10 is reflected back and forth twice; therefore, the distance between the meniscus lens and the mirror 14 is utilized three times. Accordingly, a 24 inch effective focal length telescope requires a space of only 8.75 inches when the parameters are as follows:

$$R_1 = 15.400''$$
$$R_2 = 15.600''$$
$$R_3 = 22.9375''$$
$$R_4 = 15.600''$$

where $R_1$ and $R_2$ are the radii of the concave and convex surfaces of lens 12, respectively, $R_3$ is the radius of mirrored surface 14, $R_4$ is the radius of mirrored surface 18, and wherein all four radii are taken from the same point on an extension of the optical axis of the system. As illustrated in FIG. 2, masking is obtained by means of two masks 228 and 238 associated with mirrors 18 and 14, respectively.

The structure shown in FIG. 2 is a preferred form of the telescope, for the reasons outlined above. Tube 200, having diametrically opposite trunnions 201 and 202, forms the main body of telescope housing 134, FIG. 1. Formed on the right hand end of the tube, as viewed in FIG. 2, is a flange 203 which provides a means for mounting the meniscus lens and its tilting mechanism, which is also illustrated in a diagrammatic form in FIG. 3. Ring 205, secured to flange 203 by means of four screws, such as screw 206, serves as a base upon which is mounted four electromagnets 301 through 304, respectively. A plan view of electromagnet 302, FIG. 2a, is typical of all four electromagnets; while a section taken through one of the coils of electromagnet 301, FIG. 2, is typical of all the coils, and the manner in which their pole pieces 207 are attached to ring 205.

Figure 2A:
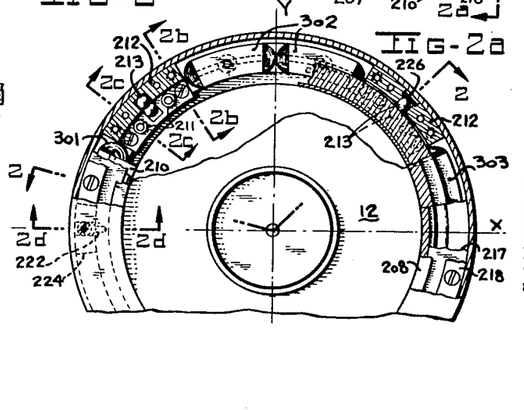
Figure 2B:
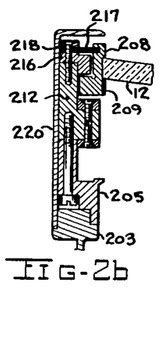
Figure 2C:
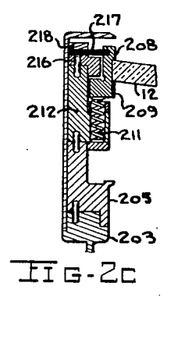
Figure 2D:
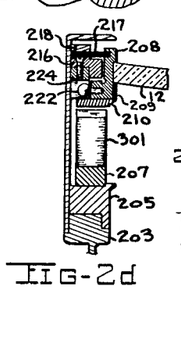

Meniscus lens 12 is mounted in an annular member 208 where it is held in place against a shoulder by a retaining ring 209 which is pressed against lens 12 by four magnet armatures 210 attached to the flange of member 208, as shown in FIGS. 2 and 2d. To confine member 208 and its lens 12 to a definite position with limited axial movement, four ring segments 212 are mounted on ring 205, as shown in FIG. 2b, between magnets 301 through 304, as shown in FIG. 2a. Each of the segments 212 is provided with balls 213 for making point contact with the three external surfaces of the flange portion of member 208, and in addition, each segment is provided with two springs 211, FIGS. 2a through 2c, for exerting pressure against said flange portion in the direction of the stop ring 216. A gasket 217 made of flexible material has its inner circumference fitted snugly into a groove formed in member 208, and its external circumference clamped between stop ring 216 and clamp ring 128. Gasket 217 and hood 220 effectively seal one end of the telescope housing to prevent the entrance of dust.

Pressed into the cylindrical surface of the flange portion of member 208, as shown in FIG. 2d, is a pin 222 having a spherical head which engages a slot in block 224. This arrangement prevents any rotational movement of lens 12 about the optical axis of the telescope once the lens and its operating mechanism has been placed in proper adjustment, which adjustment may be accomplished by the use of shims between the mating surfaces of the various rings and ring segments where necessary.

Each of two adjacent ring segments 212 includes a flat leaf spring 226 which presses against the ball in contact with the external cylindrical surface of the flange portion of member 208 as shown in FIGS. 2 and 2a. Thus, a force along a line passing through pin 222 urges member 208 toward one side of the telescope and against the similarly located ball in each of the remaining two ring segments 212. FIG. 2a shows one of the segments 212 located between magnets 302—303, and is typical of both; while the other segment, not shown, is located between magnets 303 and 304, of which the latter is also not shown. This arrangement eliminates unrestrained radial movement of the lens 12, and yet it permits almost frictionless movement of the lens by the magnets 301 through 304.

As shown in FIG. 2, a tubular mask 228 attached to the inside surface of lens 12 completely surrounds mirror 18 for the purpose of excluding all light rays except those reflected from mirror 14.

Mirror 14, located in the left-hand end of tube 200, is mounted in an assembly including an end plate 230 having a flanged exterior cylindrical surface which engages the end of tube 200 where the plate is held by flathead screws 231. A sleeve 232 having a small internal shoulder at one end and a narrow internal groove at the other end serves to attach mirror 14 to plate 230. A ring 233 having its external periphery engaged in the internal groove of sleeve 232 pulls the sleeve toward plate 230 by means of several screws such as screw 234; while mirror 14 is forced away from plate 230 and against the internal shoulder of sleeve 232 by several headless screws, such as screw 235, which are threaded into plate 230 and which pass through clearance holes in ring 233 finally pressing against backing ring 236 behind mirror 14. By adjusting the screws 234 and 235, mirror 14 can be tilted when necessary to direct its reflected rays against mirror 18.

Mask 238 is attached to the center of plate 230, passes through the central opening 16 of mirror 14, and extends in the direction of mirror 18 for the purpose of excluding all light rays except those which are reflected from mirror 18 and which are intended to pass through scanning disc 400, condenser lens 240, and strike photoelectric cell 17. Scanning disc 400 is a part of the hollow rotor 242 of a hysteresis motor, generally designated 20, which is mounted on and made concentric with plate 230. A cover 244 surrounding the photocell 17 and motor 20 completes the dust protection of the telescope.

Figure 3:
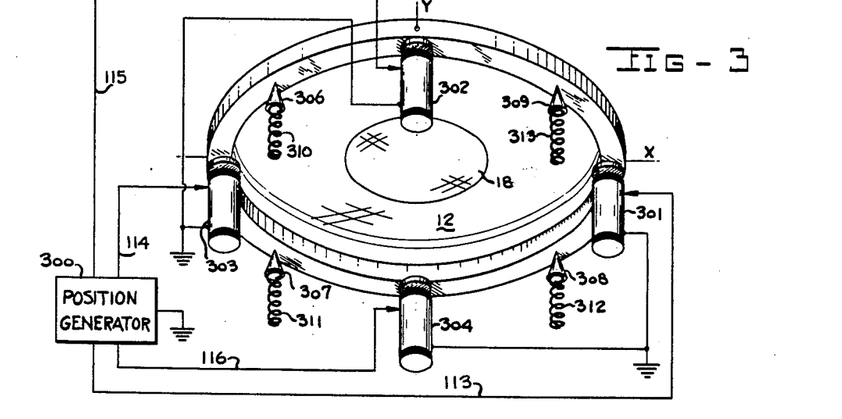
FIG. 3 is a perspective view of the image-shifting mechanism of the telescope of FIG. 1.
Figures 4, 5, 6, 11, 12, 13, 14:
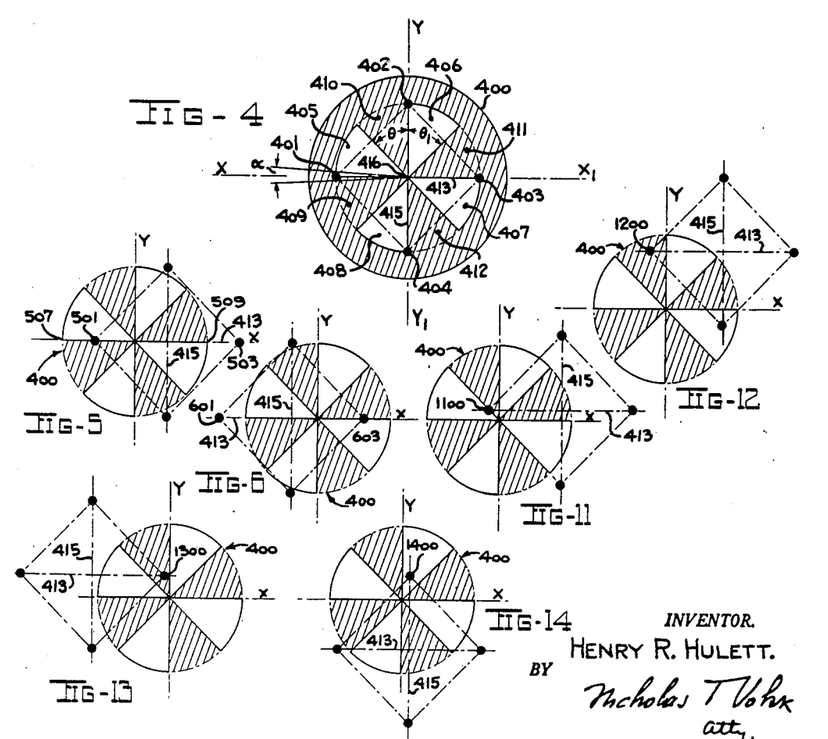
FIGS. 4 through 6, and FIGS. 11 through 14 are explanatory figures illustrating various possible positions of the star image on the scanner.

Star positioning of the type illustrated in FIG. 4 is accomplished by electromagnets 301 through 304, FIG. 3, which sequentially tilt meniscus lens 12 and associated mirror 18, thereby moving the image of an object in front of the telescope across the focal plane of the telescope. The movement is of the order of one cycle per eight seconds. A substantially square wave movement is produced because of the very limited movement of lens 12 required for producing the shift in the position of the star image from one position to the next. Thus, one complete scan, through 360°, is accomplished in eight seconds, so that the star image dwells in position 401 for two seconds, and in positions 402, 403 and 404 for two seconds each. The time for the image to travel from one position to the next is neglected because it is insignificant.

Normally, when the optical axis of the telescope points directly at a source of radiant energy such as a star, the star images are in the positions 401, 402, 403, and 404, as illustrated in FIG. 4. Examination of FIG. 4 reveals the fact that the center of the star image appears directly at the outer periphery of scanner 400, which is shaped as an episcotister having transparent portions 405, 406, 407, 408, and opaque portions 409, 410, 411, 412. While the illustrated episcotister has four transparent sectors and four opaque sectors, it is to be understood that a larger number of sectors may be used, in which case the carrier frequency produced by the episcotister will be higher.

The number of sectors used in the episcotister is determined by the following factors: In order to reduce the sky noise and the amount of sky illumination reaching the photoconductive cell, it would be desirable to have as many sectors as possible in the episcotister. However, the actual star image is finite in its size and it imposes definite limits on the number of sectors which can be used in a practical episcotister. The increase in the number of episcotister sectors may soon reach the point when the central portion of the episcotister will have transparent and opaque sector portions whose angles are smaller than the angle $\alpha$ of the star image, the above angles being referred to the center 416 of the episcotister as shown in FIG. 4. Stated differently, the size of the star image may be such that it will overlap part of the opaque sector and part of the transparent sector, and scanning of the star image with the episcotister will produce no light modulation, but will merely reduce the amount of steady light reaching the photoconductive cell. Therefore, in order to generate a very well defined carrier frequency by scanning the image of the star with the episcotister, it becomes necessary to have the angles of the respective sectors, or angles $\theta$, $\theta_1$, etc., considerably larger than angle $\alpha$.

Assume that the frequency produced by scanning the star light, by means of the episcotister, is termed the carrier frequency. This carrier frequency should be sufficiently high to remove it from the spectrum of frequencies produced by various mechanical vibrations which are generally present in the mechanical structures supporting star trackers. For example, if the star tracker is mounted on an airplane, and the vibration frequencies present in the airplane structure begin with very low frequencies and asymptotically approach zero amplitude in the region of 5000 cycles per second, it would be desirable to have the carrier frequency higher than 5000 cycles per second, which undoubtedly would place it well beyond any frequencies that are apt to be produced by the vibration of the mechanical structures.

An additional factor which must be considered in selecting the carrier frequency is the frequency response characteristic of the photoconductive cell utilized for converting light pulsations into corresponding pulsations of electrical energy. For example, if a lead-sulphide cell is used for accomplishing this purpose, its signal-to-noise ratio is highest in the frequency spectrum from approximately 100 cycles through several thousand cycles per second, with a broad maximum somewhere in this region. Accordingly, if one is to consider the carrier frequency from the point of view of the photoconductive cell frequency response characteristic, it would be desirable to have the carrier frequency in the region of maximum signal-to-noise ratio. It was thought previously that twinkle frequency of the star should also be considered in selecting the carrier frequency. This twinkle frequency may be in the region of from 50 to 1400 cycles per second. Actual experimental results indicate, however, that twinkling of the star is not especially important and, for all practical purposes, need not be considered for selecting the carrier frequency.

The final carrier frequency selected should be one which gives maximum signal-to-noise ratio, where noise also includes mechanical vibrations which are apt to produce parasitic signals in the electrooptical system of the tracker. In the illustrated example, the scanner has four opaque sectors and four transparent sectors, and its angular velocity is 400 revolutions per second. Accordingly, the carrier frequency is 1600 cycles per second.

The path followed by the star image when the optical axis of the telescope points directly at the star, is as illustrated by the dotted lines in FIG. 4. As mentioned previously, in the example under consideration, the image of the star dwells at each point for substantially 2 seconds, thus completing the image positioning cycle within 8 seconds. The duration of this cycle is determined primarily by the time constant of the meniscus lens switching system including electromagnets 301 through 304. Because of the inertia of this system, it is impossible to obtain instantaneous positioning of the meniscus lens into its four discrete positions without any loss of time. Deflecting the meniscus lens 12 from one position to the next in order to produce displacement of the star image from position 401 to position 402, etc., as illustrated in FIG. 4, requires some finite interval of time, at which time the star tracking system should be prevented from receiving any signals from the telescope because travel of the star image from the positions indicated in FIG. 4 will produce erroneous signals in the star tracker. This means that the entire star tracker will be rendered inoperative every time the position of the meniscus lens 12 is changed. If the time interval required for tilting the meniscus lens is $t$, and the time interval when the meniscus lens remains at rest is T, then $T \gg t$. In addition, it is clear that any decrease in T will be at the expense of the available useful signal.

It is also clear that the duration of one scanning or image positioning cycle must be shorter than the overall time constant of the star tracking system in order to obtain maximum response and signal-to-noise ratio, since obviously if the overall time constant of the system was made shorter than the time of one scanning cycle, one could not be sure of obtaining a signal in one system time constant under certain conditions as exemplified by FIG. 6; furthermore, the signal-to-noise ratio, which is roughly proportional to the square root of the system time constant, is increased if the system time constant is lengthened sufficiently to insure that a signal is obtained in every time constant. Since the signal-to-noise ratio depends upon the system time constant, it is obviously desirable to make the time constant as long as possible. With present day low-drift gyroscopes, time constants as long as one minute may be permissible, thereby increasing the signal-to-noise ratio of the system.

It is possible, however, to improve the signal-to-noise-ratio still further if the electrical system has a bandpass characteristic in the circuitry for detecting the electrical signals. In the prior systems, amplifier bandwidths of at least the order of one cycle seemed necessary, whereas in the proposed system bandwidths of the order of 1/60 cycle may be used. Assuming that a final signal-to-noise ratio of unity is desired, it can be shown theoretically that the signal required in the prior art systems would be approximately twice that required in the system of the present invention.

Referring again to FIG. 4, two types of image paths may be used for obtaining the sought image pattern. The path may be square in shape, or it may be in a form of a retraced rectangular cross along the diagonals 413 and 415, in which case the path of the image may be as follows: From position 401, the image is shifted to the center 416, whereupon it is shifted to position 402. From position 402, it is shifted again to center 416, and then to position 403, etc. The type of path followed by the image depends in the main on the type of excitation used in connection with the image-positioning electromagnets 301, 302, 303, and 304 which are energized from a position generator 300, FIG. 3.

FIG. 3 illustrates in a schematic form the type of mounting used in connection with the meniscus lens 12. The lens normally is held in a neutral position by means of four fulcrum members 306 through 309, which normally are pressed against meniscus lens 12 by springs 310, 311, 312 and 313, respectively. The actual structure, which is shown in FIG. 2, is adjusted so that the neutral position of the star image coincides with the optical axis of the telescope with the result that in this position the star image appears at center 416 of episcotister 400. The fulcrum members 306 through 309 are mounted so that they can travel along lines parallel to the axis of the telescope when pressure is exerted against them by the meniscus lens 12. This travel is limited by structure shown more in detail in FIG. 2. Because of the yieldable type of mounting of fulcrum members 306 through 309, the mirror and lens may be tilted into four stable angular positions, depending upon the excitation of the electromagnets 301 through 304.

The meniscus lens 12 and the centrally positioned mirror 18 are normally in such position that when mirror 18 is in its neutral position, the image of the star is focused at the center 416 of the episcotister 400. When magnet 301 is energized, it tilts the meniscus lens 12 so that it pivots on the members 306 and 307, which places the star image in position 401 illustrated in FIG. 4. Upon deenergization of electromagnet 301, the meniscus lens 12 returns to its neutral position under the action of springs 312 and 313, at which time the star image is returned again to the central position 416 on the episcotister. Energization of electromagnet 302 pivots the meniscus lens 12 around the members 307 and 308 with the result that the image of the star is shifted from position 416 to position 402 in FIG. 4. Such sequential tilting of the lens is continued until the completion of the positioning cycle, whereupon the cycle repeats itself continuously in synchronism with the functioning of the entire star tracking system, as will be described more fully in connection with FIG. 1.

From the above description, it may be seen that when electromagnets 301 through 304 are energized in sequence, deenergization of one magnet precedes energization of the next electromagnet. The path traced by the star image is of the cross type illustrated by the diagonal lines 413 and 415 in FIG. 4. Under such conditions, the electrical pulses furnished by position generator 300 over conductors 113 through 116 are slightly spaced from each other.

In order to produce a more rapid shifting of the meniscus lens 12 by positioning the star images directly from position 401 to position 402, etc., along the square illustrated in FIG. 4, it is only necessary to energize succeeding electromagnets slightly ahead of the time of the deenergization of the preceding electromagnet. Under such conditions, the following takes place: If one is to assume that electromagnet 301 is energized, it follows that meniscus lens 12 is pivoted around the fulcrum members 306 and 307 and the position of the star image is at 401. If the succeeding electromagnet 302 is energized before electromagnet 301 is deenergized, both of these electromagnets will be energized simultaneously, with the result the meniscus lens will be pivoted momentarily around member 307. If deenergization of electromagnet 301 follows immediately after tilting of the lens around fulcrum member 307, the process will continue until the lens assumes the next position, at which time it is tilted around fulcrum members 307 and 308. Therefore, a more direct image positioning path may be obtained by merely adjusting the duration of the signals generated by the positioning generator 300. Although the position generator, as later described, is shown in the form of a ring multivibrator which is controlled by a master multivibrator, a cam actuated switching circuit can be substituted for the multivibrators. Cam actuated switching is old in the switching art, and, therefore, needs no illustration.

Figure 1:
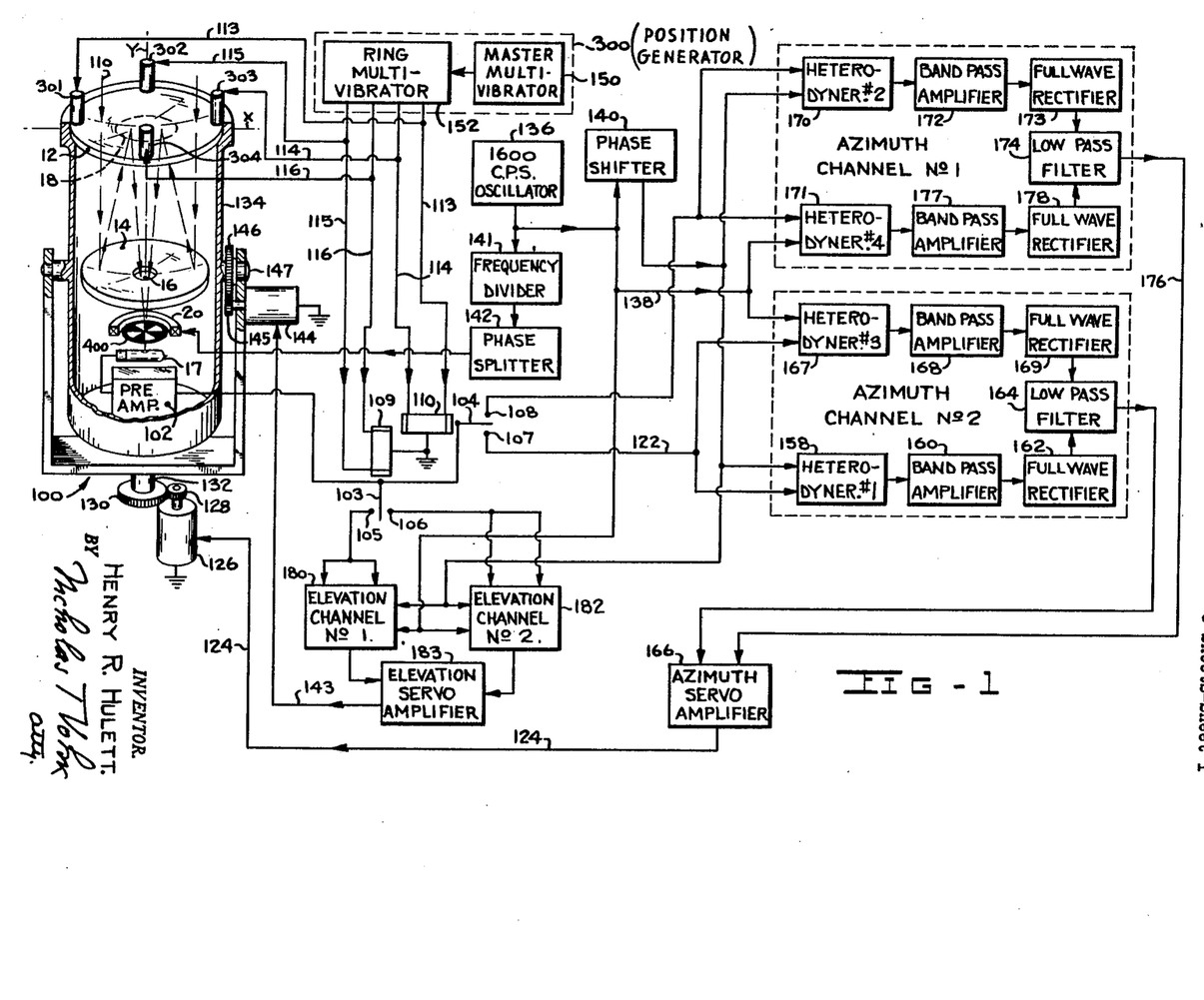
FIG. 1 is a block diagram of the system according to the present invention.

It is to be noted in connection with FIG. 1, that electromagnets 301 through 304, for the sake of clarity, are mounted on top of lens 12; while in FIGS. 2 and 3, the relays are mounted underneath the marginal edge of the lens. Because of this change in position, relay 301 appears on the left hand side in FIG. 1, and on the right hand side in FIGS. 2 and 3, with a corresponding diametrical shift in the positions of the other relays. Such a showing of the changed positions permits the illustration in FIG. 4 to apply equally well to each of the FIGS. 1, 2 and 3.

The electromechanical structure, meniscus lens 12, and the electromagnets used for altering the position of the meniscus lens are illustrated in more detail in FIG. 2, through FIG. 2d.

Referring now to the block diagram of the star tracking system illustrated in FIG. 1, the entire telescope assembly, generally designated 100, is shown with the meniscus lens 12 being mounted at the open end of the telescope, and the photoconductive cell 17 being positioned at the bottom portion of the telescope. Because of the previously mentioned scanning, by scanner 400, of the radiation reaching the telescope, the signal reaching the photoconductive cell 17 is a rectangular wave of the type illustrated by 700 in FIG. 7. Not all of the light produced by the star image reaches the photoconductive cell 17 at this time, since half of the star image blocked by the scanning disc 400, and only half of the image produces useful signals. Furthermore, the amount of light which does reach cell 17 is a function of the position of the image relative to the episcotister periphery, having a maximum value when the star image lies completely within the periphery of the episcotister. As illustrated by the double-headed arrow 701 in FIG. 8, the phase of this rectangular wave may be either retarded or advanced, this change in phase taking place when the position of the star image 401 is shifted either in the clockwise direction, or a counter-clockwise direction from that illustrated in FIG. 4. If scanning disc 400, as viewed in FIG. 4, rotates in the clockwise direction, changing of the angular position of the star image in a clockwise direction will produce retardation in phase of signal 700; conversely, if the angular position of the star changes in a clockwise direction, the phase of signal 700 will be advanced. It is immaterial, for proper operation of the system, whether the scanner revolves in the clockwise or counter-clockwise direction.

When the image of the star is in position 401 and then in position 403, FIG. 4, the resulting electrical signals are impressed first on phase sensitive azimuth channel #2, and then on phase sensitive azimuth channel #1, respectively, and when the star image is switched over to the positions 402 and then 404, the signals are impressed on the phase sensitive elevation channels #1 and #2, respectively, as will be described more in detail below.

Referring again to FIG. 1, the rectangular wave signals produced in the photoelectric unit, which consists of photoconductive cell 17 and preamplifier 102, are impressed on two relay armatures 103 and 104, which are positioned between relay contacts 105, 106, and relay contacts 107, 108, respectively, of two gating relays 109 and 110, respectively, in a sequence which is controlled by the position generator 300. The position generator 300 includes a master multivibrator 150 coupled to a ring multivibrator 152. Multivibrator 150 is a free-running multivibrator, which is utilized for controlling multivibrator 152. Multivibrator 152 is a conventional ring type multivibrator, operable upon application of a series of pulses derived from the signals appearing at the plate of one tube of multivibrator 150 for producing a series of four positive gates occurring in sequence. The sequence of the gates, as they appear on conductors 113 through 116 connected to the sections of multivibrator 152, is conductor 113, conductor 115, conductor 114, and conductor 116. The outputs of multivibrator 152 are connected to the gating relays 109 and 110, respectively, over conductors 115, 116 and conductors 113, 114. The sequential operation of these relays is as follows: Armatures 103 and 104 have three different positions; neutral position and one position against each of their respective contacts. When armature 103 is against contact 105 or 106, armature 104 is in the neutral position. Similarly, when armature 104 is against contact 107 or 108, armature 103 is in the neutral position. Therefore, when a gating signal from multivibrator 152 appears on either conductor 115 or conductor 116 to energize relay 109 in one direction or the other, no gating signal appears on any of the other conductors. Accordingly, relay 110 remains unoperated and armature 104 is in the neutral position. The same operation is followed with respect to armature 103 when armature 104 is against contact 107 or 108. Such energization of the armatures 103 and 104 impresses the output of the photoconductive cell 17 and preamplifier 102 first on the phase sensitive azimuth channel #1 when the star image is in position 401 and then on the phase sensitive azimuth channel #2 when the image is in position 403, positions 401 and 403 corresponding to the azimuth positions. Similarly, the output of preamplifier 102 is impressed on the respective phase sensitive elevation channels #1 and #2 when the star image is at the positions 402 and 404, respectively.

From the above, it follows that the horizontal line 413 in FIG. 4, joining the star images 401 and 403, corresponds to an abscissa $XX_1$ and represents the azimuth plane of the telescope with respect to the star. Similarly, the ordinate $YY_1$ corresponds to the elevation plane of the telescope; the latter is represented by the vertical line 415 joining the star images 402 and 404. As will be described later in connection with the description of the operation of the star tracker, when the star images are in the position illustrated in FIG. 4, no signal is impressed on the azimuth motor 126 and elevation motor 144 since with the above image distribution, the axis of the telescope points directly at the star, and therefore no correction is required. The position generator 300 is also connected over conductors 113 through 116 to electromagnets 301 through 304, which, as mentioned previously, are used for positioning meniscus lens 12. Since electromagnets 301 through 304 and the relays 109 and 110 are both energized from the position generator 300, it follows that the output of the photoconductive cell 17 is connected to the azimuth channels #1 and #2 and the elevation channels #1 and #2 in synchronism with the positioning of meniscus lens 12 and mirror 18.

Assume now that armature 104 is against contact 107 and armature 103 is in its neutral position, which is the case when the star image is in position 401. The star signal will then be applied over conductor 122 to heterodyners #1 and #3, constituting the input circuit of the azimuth channel #2. Each azimuth channel consists of two parallel networks, each of which includes a heterodyner, a bandpass amplifier, and a full wave rectifier, the outputs of the two associated full wave rectifiers being connected to a common low pass filter. Each azimuth channel is then connected to a common azimuth servo amplifier, the output of which is connected over a conductor 124 to a direct-current reversible azimuth motor 126. The two elevation channels are identical to the azimuth channels. The shaft of motor 126 is connected to a pinion 128 which engages a gear 130, a vertical shaft 132 attached to gear 130 constituting a vertical axis of the telescope. From this, it follows that the azimuthal position of the telescope housing 134 is under constant control of the azimuth motor 126.

All the heterodyners are also connected to a local oscillator 136 which, in the illustrated example, is a 1600 cycle per second oscillator. The selection of the frequency of this oscillator is governed by the selection of the carrier frequency produced by the scanning disc 400. Since the selection of the carrier frequency has been discussed already, it need not be repeated here. The heterodyners #4 and #3 in the azimuth channels #1 and #2, respectively, are directly connected to local oscillator 136 over conductor 138, while the heterodyners #1 and #2 are connected to the same oscillator through a phase shifter 140 which introduces a 90° phase shift to the signal produced by local oscillator 136. The reason for introducing this 90° phase shift will be explained later in connection with the description of the operation of the star tracker.

The output signal from the local oscillator 136 is also impressed on a frequency divider 141 and a phase splitter 142, the output signal from the latter being impressed on the windings of the scanning motor 20 for producing the necessary rotating field in the hysteresis motor 20, FIGS. 1 and 2. Therefore, the carrier frequency generated by the scanning disc 400 is in strict synchronism with the frequency produced by the local oscillator 136 in order to keep constant the beat frequency produced in the outputs of the heterodyners.

The outputs of the elevation channeles are impressed on an elevation servo amplifier, and the output of the latter is impressed over a conductor 143, on a direct current reversible motor 144 which drives a pinion 145, and that, in turn, drives a gear 146, which is rigidly connected to an elevation trunnion 147. This trunnion constitutes the horizontal axis of telescope housing 134. Thus energization of elevation motor 144 will produce proper orientation in elevation, or automatic tracking in elevation of the selected star. Although the description of the invention as disclosed above refers to the use of servo amplifiers and motors in the azimuth and elevation servo systems, it is understood that a variety of known specific servo loops could be used to accomplish the identical purpose in the invention.

The operation of the star tracker will now be described. For simplifying the description of the operation of the star tracker, it will be assumed that a simple $XX_1$ axis, or azimuth correction is desired. In this instance the star is shifted sequentially to two discrete positions 401 and 403, which are selected so that, for zero error, positions 401 and 403 are as illustrated in FIG. 4, i.e., the outer periphery of the episcotister bisects the star image in both positions. A 1600 cycle signal will be generated at all times since part of the star is within the field of view of the scanner in both positions. It will be assumed that when the star image is in position 401, armature 104 is on contact 107 and, therefore, the star signal is impressed on azimuth channel #2. Since all the phase sensitive channels, including two azimuth and two elevation channels are connected to the output of the photoelectric unit in synchronism with the positioning mechanism of the meniscus lens 12, the star signal will be impressed on azimuth channel #2 only when the star image is in position 401 or any deviated position from that illustrated at 401 as long as this deviation is somewhere within the episcotister, i.e., between the extreme positions 401 and 403. Similarly, azimuth channel #1 will receive the star signal only when the star image is in position 403 or some inner deviation from this position. When the star image is in the elevation positions 402 and 404, the azimuth relay armature 104 is in its neutral position, and no signals are impressed on the azimuth channels, but a signal is impressed first on elevation channel #1 and then on elevation channel #2. Thus, when the star image makes a complete 360° revolution around the episcotister, each of the four channels is connected to the photoconductive cell once, with the azimuth channels alternating with the elevation channels.

Figure 7:
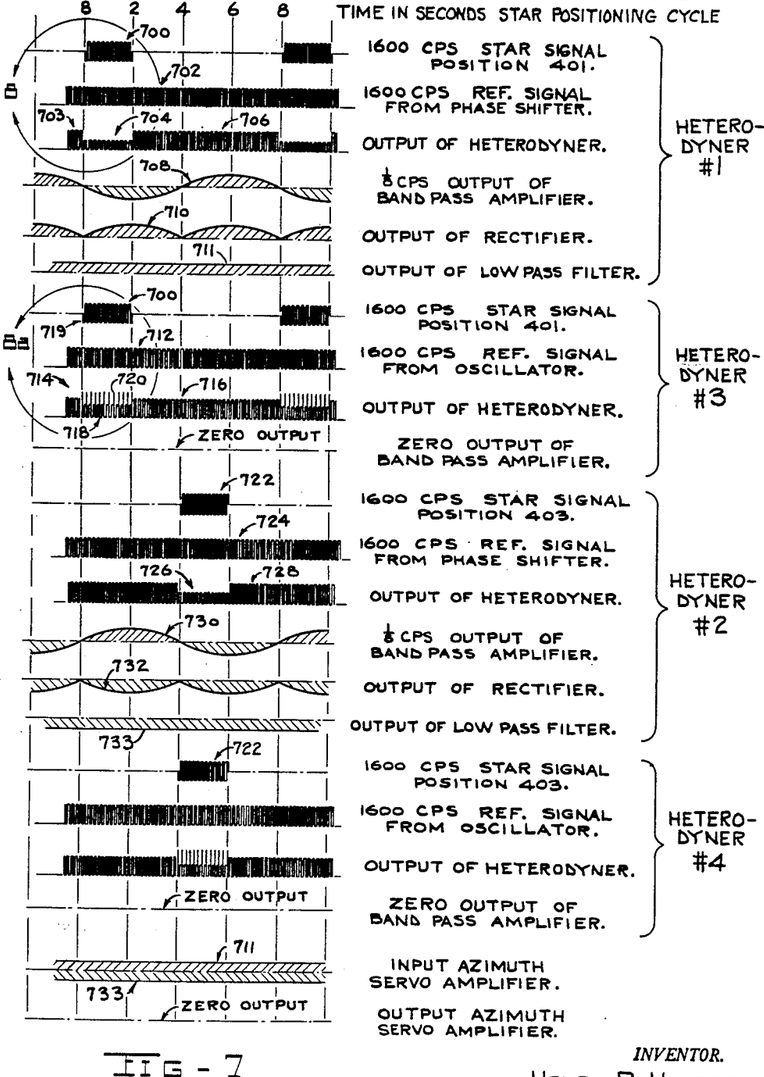
FIG. 7 illustrates oscillograms of signals produced at various points in the star tracking system of FIG. 1.
Figures 8, 8A, 10:
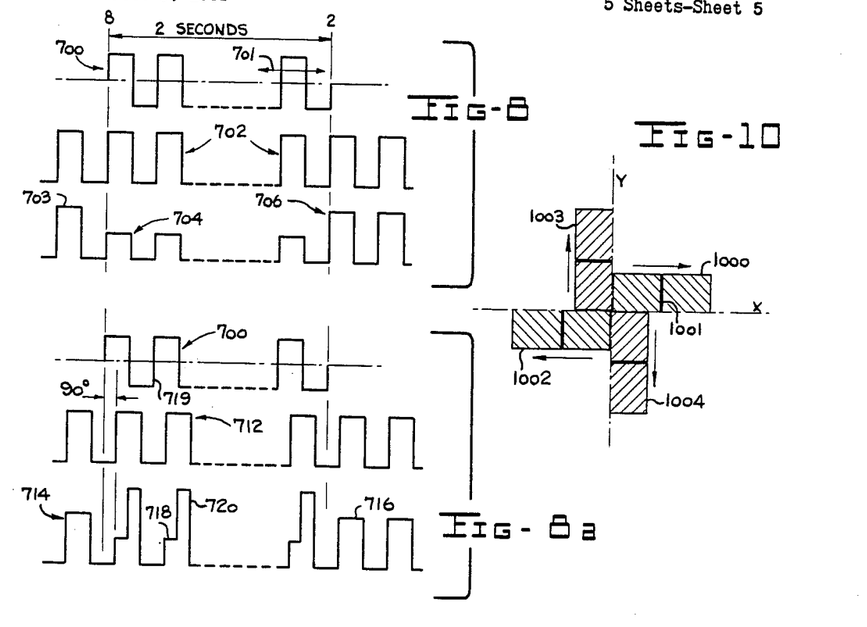
FIGS. 8 and 8a are enlargements of waveforms taken from FIG. 7.
FIG. 10 illustrates the amplitude and polarity of the azimuth and elevation tracking signals applied to the azimuth and elevation servo-amplifiers.

Referring now to FIG. 1 as well as FIGS. 7, 8, and 8a, and assuming, as before, that the star image is in position 401 and that armature 104 of the azimuth channel is on contact 107, an identical star signal is impressed on the heterodyners #1 and #3. This signal is illustrated at 700 in FIG. 7. In the example under discussion, the signal has a frequency of 1600 cycles per second since the episcotister has four sectors and revolves at 400 revolutions per second.

Since the heterodyner #3 is connected directly to oscillator 136 over conductor 138, and heterodyner #1 is connected to the local oscillator 136 through phase shifter 140, which introduces 90° phase shift, the reference signals appearing in these two heterodyners will be 90° out of phase with each other. If it is assumed that the reference signal on heterodyner #1 is in phase with the star signal 700 when the star is in position 401, then the relationship of the star signal 700 and of the reference signal 702 impressed on the heterodyner #1 will be that as illustrated in FIG. 7.

Figure 9:
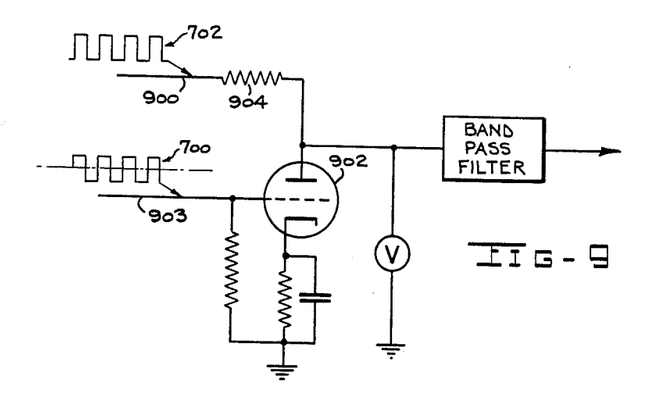
FIG. 9 is a schematic diagram of one type of heterodyner suitable for use in FIG. 1.

FIG. 9 discloses one type of heterodyner which is suitable for the disclosed system. The reference signal 702 is impressed on the plate of a triode 902 over a conductor 900. There is no other plate potential source connected to the plate circuit and, therefore, triode 902 is rendered conductive only when the reference signal appears on its plate. The star signal is impressed on the grid of the triode over a conductor 903, and when the two signals coincide, the tube is rendered fully conductive. Because there is a plate resistor 904 in the plate circuit, there will obviously be a drop in the plate potential when the tube is rendered fully conductive. The waveform 704 of the signal appearing at the plate of triode 902 will therefore be a function of the waveforms of the star signal and of the reference signal. The amplitude of this output signal will rise when there is no signal impressed on the grid because of the increase in the cathode-plate resistance of triode 902. This is illustrated at 703 in FIG. 7. The variations in the plate potential are impressed on bandpass amplifier 160, the center bandpass frequency of which is 1/8 cycle per second, which corresponds to the positioning frequency of the star image, since the star image dwells in position 401 for two seconds and completes a 360° cycle in 8 seconds. A substantially sinusoidal waveform 708 appears in the output of the bandpass amplifier 160, and this wave is impressed on a full wave rectifier 162, whose output signal is shown by signal 710.

This rectified signal is impressed on a low-pass filter 164 whose cutoff frequency is of the order of 1/8 cycle per second. A direct-current signal 711 appears in the output of the filter, and this signal is impressed on the azimuth servo amplifier 166 and then on the azimuth motor 126 if it is not neutralized by the output of the azimuth channel #1, as described below.

The same star signal 700 is impressed on the heterodyner 167 over conductor 122. Since heterodyner 167 is directly connected to oscillator 136 over conductor 138, and since there is a difference of 90° between the phase of the reference signal 702 impressed on heterodyner 158 and the heterodyner 167, it follows that there will be a 90° phase displacement between the star signal 700 and the reference signal 712 in heterodyner 167. The circuit and the functioning of this heterodyner is identical to that of heterodyner 158 and, therefore, its output will have the waveform illustrated at 714 in FIG. 8a. The rectangular portion 716 of this waveform corresponds to the reference signal 712 impressed on the plate of the heterodyner in the absence of signal 700, while the rectangular portions 718 and 720 correspond, respectively, to the coincidence of the rectangular waves 700 and 712. High amplitude portion 720 is produced when signal 712 is at its high-level value and a negative voltage 719 is impressed on the grid by the star signal 700, thereby raising the cathode-anode resistance of triode 902 and, consequently, increasing the output signal voltage. The low amplitude portion 718, on the other hand, is produced when there is a coincidence of positive voltages on the grid and the plate of triode 902.

When signal 714 is impressed on the bandpass amplifier 168, the average amplitude of signal 714 will be equalized, with the result that no output signal is produced by bandpass amplifier 168. Accordingly, a direct-current signal 711 will appear in the output of the low pass filter 164 as long as the star is in position 401. This signal, after being impressed on an azimuth servo amplifier 166, would appear to produce an azimuth tracking signal in its output, which, in turn, would operate the azimuth tracking motor 126. Since, at this time, with the star image being in position 401, the telescope axis points directly at the star, it is obvious that the effect of signal 711 on the azimuth motor should be neutralized completely. This neutralization is accomplished by impressing a signal of identical amplitude but of opposite polarity on servo amplifier 166 from the output circuit of azimuth channel #1, as described below.

When armature 104 of relay 110 is placed on contact 108 by position generator 300, the star image will be in position 403, and the star signal 722 now will be impressed on azimuth channel #1 through heterodyners 170 and 171. The waveform of the star signal 722 will be identical to the waveform of the star signal 700, but it will be lagging the star signal 700 by 180° or 4 seconds. It is to be noted here that this 180° phase displacement refers to the displacement of the groups of waves with respect to each other. This phase displacement under discussion is controlled by the time of occurrence of these groups of waves, the group represented by the rectangular waves 722 lagging behind the group 700 by 180° or 4 seconds. As set forth above with regard to azimuth channel #2, heterodyner 170 receives its reference signal from the output of phase shifter 140, while heterodyner 171 receives its reference signal directly from oscillator 136. Therefore, the reference signal 724 impressed on heterodyner 170 and the star signal 722 will be in phase with each other as illustrated in FIG. 7. Since the operation of this heterodyner, in other respects, is identical to the operation of the heterodyner 158, the waveforms 726—728 of signal appearing in its output will be identical to the waveforms 704—706 appearing in the output of heterodyner 158, but the two will be out of phase with respect to each other by 180°.

The output signal from heterodyner 170 is impressed on a bandpass amplifier 172 whose output is illustrated by the waveform 730. It is a substantially sinusoidal wave whose period is equal to 1/8 of a cycle per second. This wave is then impressed on a full wave rectifier 173 and a low pass filter 174, whereupon the output of the low pass filter is impressed over a conductor 176 on the azimuth servo amplifier 166. The output of the full wave rectifier is illustrated at 732. It is to be noted that this rectifier is connected so as to give the output signal 732, which is of opposite polarity to the polarity of signal 710, and, therefore, the direct current signal 711 is also of opposite polarity as compared to the polarity of the direct-current signal 733. These two signals, 711 and 733, are combined in the azimuth servo amplifier 166 where they neutralize each other as long as the two star images 401 and 403 are symmetrically disposed with respect to the center of the episcotister, as illustrated in FIG. 4. Therefore, as long as the star images 401 and 403 are positioned along the outer periphery of the episcotister 400, the signals 711—733 are neutralized in azimuth servo amplifier 166, and no signal is impressed on azimuth motor 126, with the result that the telescope frame 100 remains at rest. This corresponds to the initial premise that when the star images 401 and 403 are in the position illustrated in FIG. 4, then the optical axis of the telescope points directly at the star. Obviously, under such conditions, no signal should be impressed on azimuth motor 126.

The same star signal 722 is also impressed on heterodyner 171. However, since the reference signal impressed on heterodyner 171 is 90° out of phase with the star signal, no signal will appear in the output of the bandpass amplifier 177, and the full wave rectifier 178. Therefore, the functioning of the heterodyner 171, bandpass amplifier 177, and full wave rectifier 178 in azimuth channel #1 is identical to the corresponding heterodyner 167, bandpass amplifier 168, and full wave rectifier 169 in azimuth channel #2. It is clear, therefore, that as long as the star image remains on the horizontal axis $XX_1$, no output signal is generated by the channels connected to heterodyners 171 and 167. As will be described more fully below, the presence of these channels is necessary for introducing an azimuth correction only when the star image departs from its position on the horizontal axis $XX_1$.

The operation of the elevation channels 180 and 182 is identical to the operation of the azimuth channels #1 and #2. The inputs of the elevation channels are connected to the photoconductive cell 17 when armature 103 of relay 109 is either on contact 105 or 106. As may be recalled, this armature is placed on these contacts by the position generator 300 when the star image is either in position 402 or position 404, FIG. 4. As in the case of the azimuth channels, the elevation channels will not impress any tracking signal on the elevation servo amplifier 183 and elevation motor 144 as long as the positions of the star images 402 and 404 are both on the periphery of episcotister 400.

FIG. 5 discloses the position of the star images at some arbitrary position in terms of azimuth with the two azimuth images, however, still remaining on the $XX_1$ axis. Thus, the previously discussed azimuth positions 401 and 403 now occupy the respective positions 501 and 503. At this time, only azimuth channel #2 will receive any signals from the star since now the entire star image 501 is scanned by episcotister 400, while in position 401 only half of the light flux produced by the image passed through the episcotister. Accordingly, the amplitude of the signal from the star will be twice the amplitude of signal 700, with similar increases in the amplitudes of the sinusoidal wave 708 and direct current signal 711. This signal now will be impressed over conductor 124 on the azimuth tracking motor 126, which at once will operate to restore the position of the telescope axis to its on-star position. It should be mentioned here that since image 503 is beyond the periphery of episcotister 400, no signal is produced by star image 503 and, therefore, no neutralizing signal is produced by the azimuth channel #1. Accordingly, the entire amplitude of the direct current signal will be available for operating the azimuth tracking motor 126 as long as the star image 501 is anywhere on the axis within the boundaries of episcotister 400. It should be also noted that the amplitude of this signal is uniform as long as the star image travels from point 507 to point 509. Therefore, the amplitude and polarity of the azimuth tracking signal 1000, illustrated in FIG. 10, also remains constant throughout this path of the star image. Line 1001 indicates that the disclosed star tracker does not deliver any azimuth tracking signal when the star is directly in the center of the episcotister. This is due to the fact that at this time the star image is not obliterated completely by the sectors of the episcotister and therefore no 1600 cycle star signal is produced in the output of the photo-conductive cell 17. Since there is also a certain degree of the star image jitter present, the above condition represents an unstable equilibrium and, in actual practice, does not represent a point of actual stall.

FIG. 6 discloses a star image pattern in which image 603 is within the episcotister and image 601 is outside of the episcotister. In this case, the star is traveling from position 403 to position 401, i.e., from right to left in FIG. 4, and the polarity of the output signal will be as illustrated at 1002 in FIG. 10 due to the fact that the useful tracking signal now will be delivered by rectifier 173 rather than rectifier 162 and will correspond to the negative polarity signal 733.

From the description given thus far, it follows that as long as the star image remains on the $XX_1$ axis, the entire azimuth tracking could be accomplished only with the heterodyners 158 and 170, insofar as the azimuth tracking channels are concerned, and also without any additional assistance from the elevation tracking channels, since the output of the elevation channels, at this time, is equal to zero.

FIG. 10 may be extended for the elevation channels, in which case the polarity of the signals will be as illustrated at 1003 and 1004 in FIG. 10. From the discussion of the behavior of the azimuth channels, it follows that the behavior of the elevation channels will follow the same pattern since the disposition of the star images is identical in both cases. The only difference that exists is that the star image 402 lags the star image 401 by 90°, or two seconds, and the star image 404 lags the star image 403 by 90°, assuming that the sequence of the signals produced by the position generator 300 is such as to produce clockwise shifting of the star images.

When the position of the star is such as to produce a pattern as illustrated in FIG. 12, the functioning of the azimuth as well as of the elevation channels will be identical to that described previously, except that with the star image being in position 1200, a position signal will be produced by both heterodyners 158 and 167. Clearly, as the star positions 401 or 501 move off the X-axis, the time at which the opaque sections of the disc cut across the star will be changed and the phase of the 1600 cycle star signal will also be changed, and, in fact, this phase can be of any value from zero to ±180° with respect to the reference signal 702 on heterodyner #1. When the star signal 700 is 90° out of phase with respect to the reference signal 702, no signal will be produced in the output of heterodyner #1, and if this were the only channel available, no signal would be produced to drive the azimuth servo motor. However, the second reference signal, i.e., signal 724, which is displaced by 90° from the refrence signal 702, is impressed on heterodyner #3. Accordingly, the star signal will now be in phase with the reference signal 724, and a signal will be produced at the output of this heterodyner. This signal can be rectified and added to the output of heterodyner #1 so that the output of the combined channel is the same regardless of whether the star signal is in phase or 90° out of phase with the original reference signal. It can be readily seen that at all intermediate positions, there will be a signal from both heterodyner #1 and heterodyner #3, combining to produce the output for star positions such as 1100 or 1200, FIGS. 11 and 12, respectively. Correspondingly, in any other position of the star whereat the star images are off the $XX_1$ or $YY_1$ axes, as illustrated in FIGS. 11 through 14, instead of the positions illustrated in FIG. 4, a set of two heterodyners is available so that no matter what the phase of the star signal, it will produce a positioning signal which tends to drive the azimuth or elevation servo motor, or both, in the proper direction.

In a system which must maintain a point position in space, two correcting channels are necessary, namely, elevation and azimuth. It can be seen from the above description that for each orientation, either azimuth or elevation star images are necessary, and that for each star image, two heterodyners are necessary, so that a total of four heterodyners are utilized for each orientation, and a total of eight heterodyners are utilized in order to keep a telescope pointing at a given star. By providing two heterodyners in each of the azimuth and elevation channels, the entire 180° sector, from position 401 to 403 and from 402 to 404, as viewed in FIG. 4, is embraced and proper tracking or positioning signals will appear in the output of any given channel irrespective of the angular position of the star image.

In order to provide proper polarity or sense to the tracking signals, it is not enough, however, to have only one azimuth or elevation channel, since, as it has been explained previously in connection with FIG. 10, it is necessary to have a signal of one polarity, such as signal 1000, when the star image travels from left to right, and a signal of the opposite polarity, such as signal 1003, when the star image travels from right to left. In other words, to obtain the desired positioning signals, it is necessary to have two complete azimuth channels, and two complete elevation channels.

Since the azimuth and elevation tracking signals are independent of each other, and conditions may be encountered when either the azimuth or elevation positioning signal may have any value from zero to maximum, while the other positioning signal might have a signal which is the opposite in polarity and magnitude to that produced in the other channel, it is clear that no elevation signal could be derived from the azimuth channels and vice-versa. Accordingly, the system of the present invention utilizes two azimuth tracking channels which are independent of the two elevation tracking channels.

It is thus seen that with the proposed system a daylight star tracker is produced which has essentially a uniform signal throughout the field (except for one extremely small area) as compared with the non-uniform signal in prior systems; a small area of proportionality about the null position; and a signal-to-noise ratio appreciably greater than that of the prior systems.

What is claimed as new is:

1. An electrooptical apparatus for tracking a source of radiant energy, said apparatus comprising: a movable optical system having an axis and means for intercepting and focusing a portion of said energy in four discrete sequential positions, said positions forming a pattern having an axis coincident with the axis of said optical system when said optical axis is directed at said source, said pattern axis diverging from said optical axis when said optical axis is deflected from said source; a radiation converter intercepting said focused energy, for converting said focused energy into four electrical signals corresponding to said four discrete positions, respectively, the magnitude of each of said electrical signals being a function of the displacement of said respective position relative to said optical axis; and servo means interconnecting said radiation converter and said optical system, said servo means being responsive to amplitude unbalance in said electrical signals for moving said optical system to redirect said optical axis at said source.

2. The electrooptical apparatus defined in claim 1 in which said optical means includes a meniscus lens, a mirror having a concave reflecting surface and a mirror having a convex reflecting surface, said lens and said mirrors having axes common with said optical axis; said meniscus lens constituting first and second surfaces of said system, said concave and convex surfaces constituting third and fourth surfaces, respectively, of said system, said convex mirror constituting a portion of said second surface, said meniscus lens being coupled to electromagnetic means for tiltably positioning said lens and said convex surface in four corresponding discrete positions about said axis of said system, and signal generating means connected to said electromagnetic means for actuating said electromagnetic means to sequentially position said lens in said four discrete positions in four corresponding timed periods, the sum of said timed periods being equal to one cycle for said apparatus.

3. The electrooptical system defined in claim 1 in which said radiation converter comprises: means for modulating at least a portion of said focused energy; a photoelectric unit disposed axially adjacent said modulating means for intercepting said modulated energy and converting said energy into four modulated sequential electrical signals corresponding to said four discrete positions, respectively, the amplitude and phase of each of said four modulated electrical signals being a function of the relative displacement of said respective position with respect to said optical axis; four phase sensitive channels corresponding to said four modulated electrical signals, respectively; gating means for sequentially connecting said phase sensitive channels to said photoelectric unit for conducting each of said modulated electrical signals to said respective phase sensitive channel, said channels having means for transforming said respective modulated signals into four respective voltages having magnitudes proportional to the amplitudes of said respective modulated signals, and said servo means being connected to said phase sensitive channels and responsive to said electrical voltages.

4. The electrooptical apparatus defined in claim 3 in which said gating means includes four gates corresponding to said four modulated electrical signals respectively, each of said gates having an input coupled to said photoelectric unit and an output connected to said corresponding phase sensitive channel, said gating means being coupled to said optical means for sequentially opening and closing each of said gates in synchronism with said discrete sequential positioning of said focused energy.

5. The electrooptical apparatus defined in claim 4 in which said optical means includes a movable telescope for focusing said energy in an image, said telescope having an optical axis and means for sequentially shifting said image to said four discrete positions, in four corresponding timed periods, the sum of said four periods being equal to one cycle period for said apparatus, said pattern formed by said positions being square in shape, two of said positions diagonally opposed in said pattern being representative of the azimuth of said telescope, the remaining two diagonally opposed positions in said pattern being representative of the elevation of said telescope, said azimuth positions lying on an azimuth reference axis $XX_1$ and said elevation positions lying on an elevation reference axis $YY_1$ when said optical axis points directly at said source, said $YY_1$ and $XX_1$ axis being perpendicular to and concurrent with each other and said optical axis, said pattern being movable substantially translationally with respect to said $YY_1$ axis in response to azimuth deviation of said telescope axis from said source, and said pattern being movable substantially translationally with respect to said $XX_1$ axis in response to elevation deviation of said telescope axis from said source.

6. The electrooptical system defined in claim 5 wherein said modulating means includes an episcotister and means for rotating said episcotister at a fixed rate about an axis coincident with said optical axis, said positions in said pattern lying on the periphery of said episcotister when said optical axis points directly at said source, said episcotister modulating said energy focused in said four discrete positions to produce four sequential modulated radiation signals corresponding to said four positions, respectively, each of said modulated radiation signals having firstly, a frequency directly proportional to said rotational speed of said episcotister, secondly, an amplitude proportional to the focused energy in said respective position impinging on said episcotister, and thirdly, a phase shift proportional to the angular deviation of said respective position about said optical axis with respect to said reference axes.

7. The electrooptical apparatus defined in claim 6 wherein each of said four phase sensitive channels comprises first and second parallel connected networks, each of said networks including a heterodyner, a bandpass amplifier and a rectifier in series connection; a common low pass filter connected to said rectifiers in said parallel networks, said common low pass filter having an output terminal, said respective modulated electrical signal being impressed, simultaneously on said heterodyners in said two parallel networks in said respective phase sensitive channel; and wherein said apparatus includes a local oscillator for producing first and second reference signals 90° out of phase with each other and having a frequency equal to that of said modulation, said first reference signal being impressed on said first heterodyner in each of said four phase sentitive channels, said second reference signal being impressed on said second heterodyner in each of said channels, said networks in said respective channels functioning to heterodyne said respective modulated electrical signals with said reference signals to produce said four respective electrical voltages at said respective output terminals of said low pass filters.

8. The electrooptical apparatus defined in claim 7 wherein said bandpass amplifiers have a bandwidth of the order of 1/60 of a cycle per second, said bandwidth having a center frequency equal to the frequency of the fundamental wave of said apparatus, said fundamental wave having a period equal to said cycle period of said apparatus.

9. The electrooptical apparatus defined in claim 7 in which said servo means includes an azimuth servo system and an elevation servo system, each of said systems containing a motor coupled to said telescope for controlling azimuth and elevation positions of said telescope, respectively, said azimuth servo systems being connected to said filter outputs of said two phase sensitive channels corresponding to said two azimuth positions of said focused energy, said elevation servo system being connected to said filter outputs of said two phase sensitive channels corresponding to said two elevation positions of said focused energy, said servo systems being responsive to amplitude unbalance in said electrical voltages at said respective outputs for moving said telescope to redirect said optical axis at said source.

10. The electrooptical system defined in claim 7 in which said episcotister rotating at said fixed rate is the rotor in a hysteresis motor, said motor being connected to said local oscillator through an electrical series connection of a frequency divider and a phase splitter for maintaining said episcotister rotation constant and in synchronism with said first and second reference signals.

11. An electrooptical system for tracking a source of radiant energy, said system comprising: a movable telescope for receiving energy from said source, said telescope having an optical axis and shiftable means for focusing said energy at a focal point in a reference plane perpendicular to said axis, and means for shifting said shiftable means to shift sequentially said focal point to a plurality of discrete positions in said reference plane, said positions being in fixed space relationship with respect to each other and equidistant from said axis when said axis is directed at said source, said positions being movable translationally in said reference plane in responsive to directional deviation of said axis from said source, and means responsive to said translational movement of said spaced discrete positions for moving said telescope to redirect said axis at said source.

12. In an apparatus for tracking a beam of radiant energy having an axis, the combination comprising a movable optical system for receiving energy from said beam, said system having an optical axis and including means for focusing said energy at a plurality of discrete sequential positions in spaced relationship, said plurality of discrete positions forming a fixed pattern having an axis, said pattern axis being coincident with said optical axis when said optical axis coincides with said beam axis, said pattern axis deviating from said optical axis proportionally in response to any angular deflection of said optical axis from said beam axis; and electrical means positioned to receive at least a portion of said energy focused at said plurality of discrete positions, said electrical means including additional means responsive to any deviation of said pattern axis from said optical axis for moving said optical system to redirect said optical axis to coincide with said beam axis.

13. The combination defined in claim 12, wherein said electrical means includes means for converting said portion of said energy received by said electrical means into a plurality of electrical signals corresponding to said plurality of discrete positions, respectively, the amplitude of each of said signals being a function of the relative displacement of said respective position with respect to said axis, said converting means comprising, a rotating episcotister having an axis common with said optical axis for modulating the energy in each of said discrete sequential positions which impinges on said episcotister, a condenser lens disposed axially adjacent said episcotister, and a lead sulfide cell disposed axially adjacent said condenser lens, said lens focusing said modulated energy on said lead sulfide cell, said cell converting said energy into said electrical signals.

14. In a star tracking apparatus, the combination comprising a telescope having an optical axis and a focal point and including, a meniscus lens, a mirror having a concave reflecting surface and a mirror having a convex reflecting surface, each having an axis normally coincident with said optical axis, said meniscus lens constituting first and second surfaces of said telescope, said concave reflecting surface and said convex reflecting surface constituting third and fourth surfaces of said telescope, respectively, said convex mirror constituting a portion of said second surface; and means coupled to said meniscus lens for tiltably positioning said meniscus lens and said convex reflecting surface in four discrete positions about the axis of said optical system.

15. The combination defined in claim 14 wherein said means coupled to said meniscus lens comprises, electromagnetic means coupled to said meniscus lens, and signal generating means connected to said electromagnetic means for electromagnetically positioning said lens and said fixed convex reflecting surface in said four discrete positions.

16. The combination defined in claim 14, in which said first, second, third and fourth surfaces are concentric spherical surfaces, said concave mirror being annular in shape for permitting said focal point to lie beyond said concave mirror with respect to said meniscus lens.

17. In a directable system for tracking a source of radiant energy, the combination comprising means for producing four grouped electrical signals of constant frequency, said signal groups having amplitude and phase representative of directional deviation of said system from said source, a reference signal generator producing first and second reference signals 90° out of phase with respect to each other, said reference signals having a frequency equal to the frequency of said grouped signals, four phase sensitive channels corresponding to said plurality of grouped signals, respectively, each of said channels comprising a low pass filter and first and second parallel networks, each of said networks including in series connection, a heterodyner, a bandpass amplifier and a rectifier having an output terminal, the output terminals of said two rectifiers being coupled to said low pass filter, said first reference signal being connected to said first heterodyner in each of said four channels, said second reference signal being connected to said second heterodyner in each of said plurality of channels, each of said four grouped electrical signals being impressed on said two heterodyners in said respective phase sensitive channel, said phase sensitive channels functioning to produce four corresponding electrical voltages having magnitudes proportional to the amplitudes of said respective grouped signals, and servo means responsive to magnitude unbalance in said electrical voltages for redirecting said system at said source.

18. An electrooptical apparatus for tracking a source of radiant energy, said apparatus comprising: a movable optical system for receiving energy from said source, said system having an optical axis and including means for focusing said energy at a plurality of discrete sequential focal points in a reference plane perpendicular to said axis, said focal points being in fixed spaced relationship with respect to each other, and equidistant from said axis when said axis is directed at said source, said focal points in said spaced relationship being movable translationally in said reference plane with respect to said axis in response to any directional deviation of said axis from said source; electrical means responsive to translational movement of said focal points for producing electrical output signals proportional to said translational movement; and means interconnecting said electrical means and said optical system, said means being responsive to said electrical output signals for moving said optical system to redirect said axis at said source.

References Cited in the file of this patent

UNITED STATES PATENTS

| | | |
|---|---|---|
| 2,422,333 | Bedford | June 17, 1947 |
| 2,462,925 | Varian | Mar. 1, 1949 |
| 2,521,946 | Rathje | Sept. 12, 1950 |

FOREIGN PATENTS

| | | |
|---|---|---|
| 33,746 | Holland | May 15, 1934 |